Sept. 23, 1924.
G. J. KRUM
SEAT MOUNTING
Filed Nov. 7, 1923
1,509,105
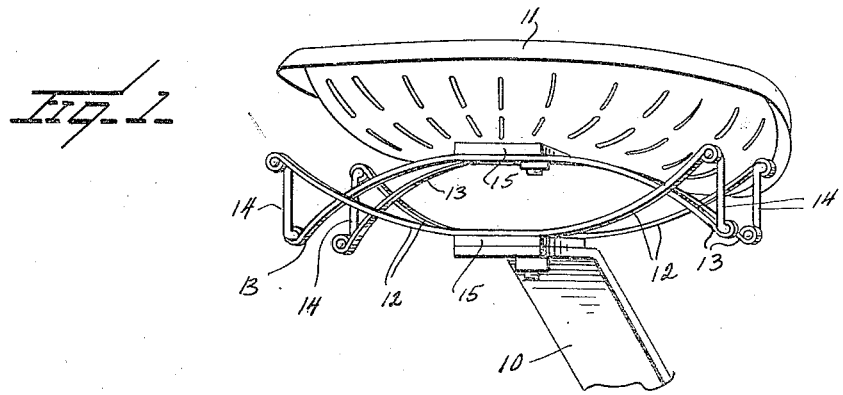
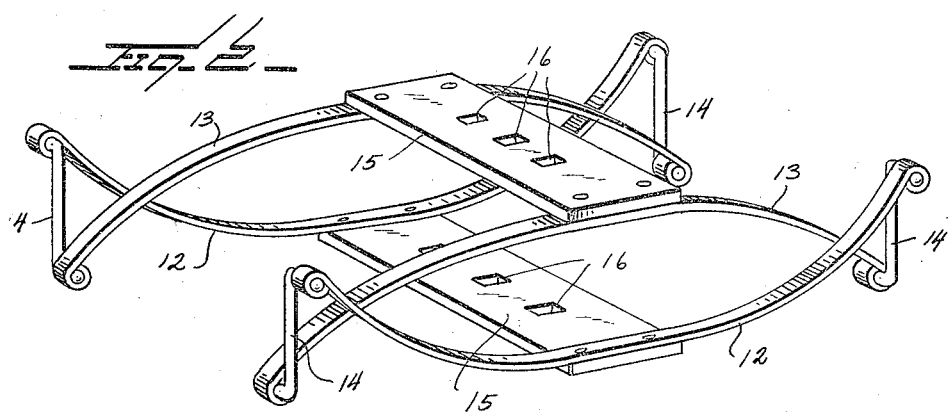
INVENTOR.
G. J. Krum
BY Watson E. Coleman
ATTORNEY.

Patented Sept. 23, 1924.

1,509,105

UNITED STATES PATENT OFFICE.

GEORGE J. KRUM, OF OLD CHATHAM, NEW YORK.

SEAT MOUNTING.

Application filed November 7, 1923. Serial No. 673,307.

*To all whom it may concern:*

Be it known that I, GEORGE J. KRUM, a citizen of the United States, residing at Old Chatham, in the county of Columbia and State of New York, have invented certain new and useful Improvements in Seat Mountings, of which the following is a specification, reference being had to the accompanying drawings.

This invention relates to seat mountings for the riding seats of agricultural implements.

An important object of the invention is the provision of a seat mounting permitting transverse oscillation of the seat and providing a cushioned mounting for the seat, while at the same time preventing vibration of the seat in the line of movement of the machine.

A further object of the invention is to provide a device of this character which may be very cheaply produced, which will be durable and efficient in service and a general improvement in the art.

These and other objects I attain by the construction shown in the accompanying drawings, wherein for the purpose of illustration is shown a preferred embodiment of my invention and wherein:—

Figure 1 is a rear perspective showing a seat mounted upon its standard by a mounting constructed in accordance with my invention;

Figure 2 is an enlarged perspective view of the mounting detached; and

Figure 3 is a perspective view of the shackle employed for connecting the ends of the springs.

Referring now more particularly to the drawings, the numeral 10 indicates the seat standard of an agricultural implement which is, as is well-known to those familiar with the art, usually directed longitudinally of the implement as regards the line of movement during operation thereof. To this standard a seat 11 is secured by means of a bolt passing through the seat, and in the ordinary structure where the seat is secured directly to the seat standard, the rigidity of this standard causes to be transmitted to the rider all of the shocks to which the machine is subjected.

In accordance with my invention I provide a support for the seat adapted for interposition between the seat and seat standard. This device consists essentially of two pairs of springs 12 and 13. The springs of each pair are semi-elliptical and the springs of one pair are inverted as regards the springs of the other pair. The end portions of the springs are crossed so that the ends of one set of springs are arranged below the ends of the other set of springs, and adjacent ends of corresponding springs are then connected by means of shackles 14 so constructed that they do not permit of relative movement of the pairs of springs in a plane transversely to such pairs.

The springs of each pair are rigidly connected by plates 15 engaging the bight portions thereof, these plates being similar and being each provided with a plurality of openings adapted for the interchangeable reception of a bolt passing through the bolt opening of the spring standard or the bolt opening of the seat as the case may be. In employing the device one of these plates is secured to the upper end of the spring standard, while the other of the plates has secured thereto the seat 11. By engaging the securing elements in the proper openings 16 of the plates 15 the seat may be adjusted longitudinally of the implement to bring the same into proper spaced relation to the controls of the machine, (not herein shown), to accommodate the person who is to occupy the seat.

It will be seen that a seat support constructed in accordance with my invention will allow of side sway of the machine and will accordingly prevent those side jolts to which the machine is subjected from being transmitted to the occupant of the seat. These side jolts are particularly dangerous as they are often the cause of the occupant being thrown from the seat. The device will, of course, due to its spring construction, cushion all shocks against transmission from the standard to the seat and render riding much more comfortable. It will furthermore be obvious that the specific construction hereinbefore set forth is capable of a limited range of change and modification without in any manner departing from the spirit of my invention and I accordingly do not limit myself to such specific structure except as hereinafter claimed.

I claim:—

1. In a seat mounting for the seats of agricultural machines and in combination with the usual seat and standard therefor, a mounting comprising two pairs of semi-elliptical springs, the springs of one pair being reversed as regards the springs of the other pair, a connection between the springs of one pair affording a means of attachment for the seat, a connection between the springs of the other pair affording a means of attachment to the seat standard, and shackles connecting the corresponding ends of the springs of the pairs permitting transverse oscillation of the upper pair of springs with relation to the lower pair of springs but preventing longitudinal movement thereof.

2. In a seat mounting for the seats of agricultural machines and in combination with the usual seat and standard therefor, a mounting comprising two pairs of semi-elliptical springs, the springs of one pair being reversed as regards the springs of the other pair, a connection between the springs of one pair affording a means of attachment for the seat, a connection between the springs of the other pair affording a means of attachment to the seat standard, and shackles connecting the corresponding ends of the springs of the pairs permitting transverse oscillation of the upper pair of springs with relation to the lower pair of springs but preventing longitudinal movement thereof, the means of connection between said pairs of springs and said seat and seat standard being adjustable transversely of the springs.

3. A seat mounting for agricultural machines and in combination with the usual seat and seat standard, two pairs of semi-elliptical springs, one pair being inverted with relation to the other pair, the ends of the springs of the pairs crossing, Z-shaped shackles connecting the corresponding ends of corresponding springs of the pairs, a connection between the springs of the upper pair affording a mounting for the seat, and a connection between the springs of the lower pair affording a means of attachment to the upper end of the seat standard.

In testimony whereof I hereunto affix my signature.

GEORGE J. KRUM.